Nov. 12, 1935.     M. S. BROWN     2,020,534
PASTRY HOLDING RACK
Filed May 9, 1934

INVENTOR
Maude S. Brown
BY
ATTORNEY

Patented Nov. 12, 1935

2,020,534

UNITED STATES PATENT OFFICE 2,020,534

PASTRY HOLDING RACK

Maude S. Brown, Tracy, Calif.

Application May 9, 1934, Serial No. 724,708

5 Claims. (Cl. 206—46)

This invention relates to the pastry retailing business and is directed particularly to a combination box and rack for safely transporting pies and cakes as from the bakery to the retail store, or from the retail store by a customer.

The principal object of my invention is to provide a combination pastry box and holding rack which will securely hold a cake disposed in said box against any sliding movement which would probably result in damage to said pastry as it came into contact with the sides of said box.

A further object of my invention is to provide a combination pastry box and holding rack which will not only prevent a cake from sliding movement within the box, but will also prevent the upper layers of a cake from sliding off of the lower layers while the box and contents are being transported.

It is also my object to provide a combination pastry box and holding rack which will, by a slightly modified use without variation in structure, hold a pie in a flat against sliding or upward movement in relation to the box when the pie is disposed in said box.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
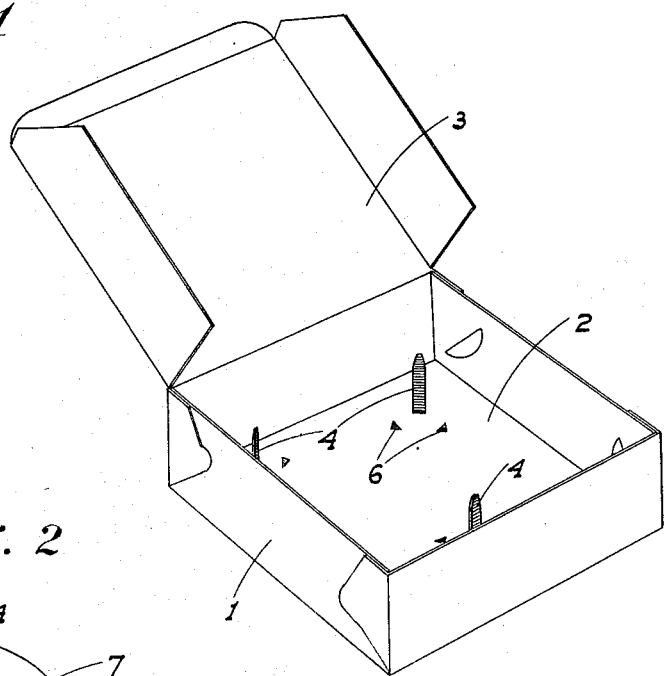
Figure 1 is a perspective view of my combination pastry box and pastry holding device.

Referring now more particularly to the characters of reference on the drawing, the numeral 1 denotes a rectangular pastry box of that character in common use today provided with a bottom section 2 and a lid 3.

Figure 4:
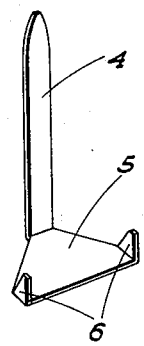
Figure 4 is an enlarged perspective view of one of the holding prong elements, preferably made of metal.

Projecting vertically through the bottom section 2 of the box 1 and spaced from the sides thereof are symmetrically disposed prongs 4 pointed on the upper end as shown. Formed integral with said vertical prongs 4 are horizontal and triangular base plates 5 which are secured in face to face relation to the outer side of the bottom section 2 by means of pointed fingers 6 which vertically project through the bottom section 2 and are subsequently bent down against the inner side of said bottom section 2. These pointed fingers 6 are formed integral with the triangular base plate 5 by turning up the points of said base plate as illustrated in Figure 4. By the above described means the vertical prong elements 4 are held in rigid upstanding position as they project through the bottom section 2.

Figure 2:
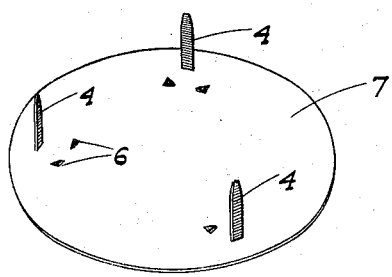
Figure 2 is a perspective view of the holding means as used in connection with a pastry flat.

In Figure 2 I illustrate a modified use to which my invention may be adapted. The prong elements 4 are identical in shape and method of mounting with those shown in Figure 1, but in Figure 2 I show the prongs 4 mounted in connection with a pastry flat 7 for the purpose hereinafter specified.

In use, my invention is especially adapted for holding cakes or pies from sliding from one side to the other in a pastry box as said box is being transported.

If a cake is to be carried in my combination pastry box and holding device, the cake is impaled centrally in the box on the prong elements 4 which project vertically from the bottom section 2 of the box 1, as in Figure 1. With said prongs projecting into the cake, it is impossible for the cake to slide one way or the other with probable damage to the frosting or cake coming into contact with the sides of the box.

The prong elements 4 are of sufficient length to project into the second layer of an ordinary cake. Actual experiment has shown that this projection into the second layer affords sufficient security against sliding for a cake comprised of as many as four layers without the danger of one or more of said layers sliding off above the upper end of the prong elements 4.

When it is desired to place the cake on a pastry flat 7 for display etc. before boxing, I employ the structure illustrated in Figure 2. The cake is impaled on the prong elements 4 centrally of the flat 7 which is preferably of slightly greater diameter than the cake. Then, when ready for boxing, the cake and flat are placed in a box and the edges of the flat will contact the sides of the box and thereby prevent the cake from sliding against the sides of said box. The above mentioned flat 7 may be either round as shown, or square.

Figure 3:
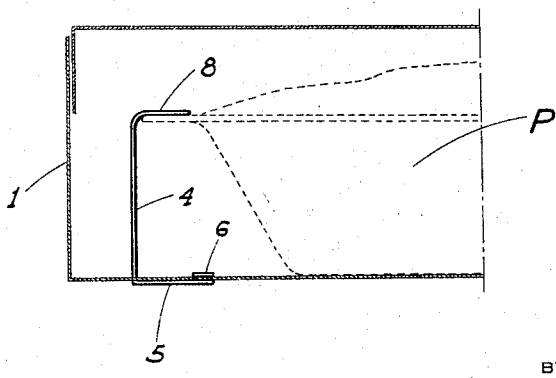
Figure 3 is a fragmentary enlarged sectional elevation illustrating the means for securing a pie (in outline) against sliding or upward movement relative to the box.

In Figure 3 I illustrate the manner in which my combination box and pastry holding device secures a pie against sliding or upward movement relative to the box. The prong elements 4 project vertically from the bottom section 2 of the box 1 and are spaced circumferentially around the outer edge of the pie and pie flat P. With the pie and pie flat P positioned in the box 1 the upper ends of said prong elements 4 are bent down over the edges of the pie as indicated at 8 in Figure 3. The pie is thus held against any sliding or bouncing within said box.

This pastry box as heretofore described is very sanitary because it is designed for a single use only and then is to be discarded. This is a long felt need in the pastry art.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In combination with a pastry transporting box, a pastry holding rack, said rack comprising a plurality of relatively long prong elements projecting vertically through the bottom of said box from beneath, horizontal base plates integral with said base plates, a plurality of fingers formed integral with the base plates and projecting through the bottom of said box from beneath, said fingers being bent over to engage the bottom and clamp the base plate against movement.

2. In combination with a pastry transporting box, a cake holding rack comprising relatively long upstanding prong elements secured to the bottom of said box upon which a cake may be impaled, said prong elements having sufficient length to project into the second layer of a layer cake disposed in said box.

3. In combination with a pastry transporting box, a pie holding rack, said holding rack comprising relatively long upstanding flexible prong elements secured to the bottom of the box, said prong elements being disposed in the box so as to be spaced circumferentially around the pie and bent downward over the edge of said pie pan.

4. A holding rack for use in a pastry box including a relatively long prong element to engage a pastry, a base plate on the prong, and fingers initially projecting from the plate in the same direction as the element; said element and prongs being adapted to be projected through the bottom of the box from beneath and the fingers being adapted to be then bent over.

5. The combination with a pastry box having side walls of a plurality of upstanding prongs mounted on the bottom of the box and in spaced relation to the side walls thereof, such prongs being adapted to be bent over a pastry element inserted between the prongs and maintain the same out of contact with the side walls and top of the box.

MAUDE S. BROWN.